United States Patent [19]

Arora

[11] Patent Number: 4,525,249
[45] Date of Patent: Jun. 25, 1985

[54] TWO STEP ELECTRO CHEMICAL AND CHEMICAL ETCH PROCESS FOR HIGH VOLT ALUMINUM ANODE FOIL

[75] Inventor: Mulk R. Arora, Columbia, S.C.

[73] Assignee: North American Philips Corporation, New York, N.Y.

[21] Appl. No.: 631,667

[22] Filed: Jul. 16, 1984

[51] Int. Cl.³ .............................................. C25F 3/04
[52] U.S. Cl. ................................................ 204/129.75
[58] Field of Search .................................... 204/129.75

[56] References Cited

U.S. PATENT DOCUMENTS

| 4,213,835 | 7/1980 | Fickelscher | 204/129.75 |
| 4,332,652 | 6/1982 | Arora | 204/129.75 |
| 4,420,367 | 12/1983 | Focher | 204/129.35 |
| 4,468,295 | 8/1984 | Pliefke | 204/129.75 |

FOREIGN PATENT DOCUMENTS

| 52-64559 | 5/1977 | Japan | 204/129.75 |

OTHER PUBLICATIONS

Electronic Components and Applications, vol. 5, No. 4, Sep. 1983, pp. 246–253.

Primary Examiner—Thomas Tufariello
Attorney, Agent, or Firm—Jack E. Haken; James J. Cannon, Jr.

[57] ABSTRACT

Aluminum electrolytic capacitor anode foil of a high cubic texture etched in a two step process by treating the foil in an electrolyte bath containing 3% hydrochloric acid and 1% aluminum as aluminum chloride under the influence of a direct current and at a temperature of 75° C., and in a second step treating said etched foil in an aqueous bath of 8% nitric acid and 2.6% aluminum as a nitrate at a temperature of 85° C. for 5 to 7 minutes. The foil thus etched has a significantly higher capacitance resulting from a greater density of tunnels, an elongation of the tunnels, and a fairly linear tunnel structure.

11 Claims, 4 Drawing Figures

TWO STEP ELECTRO CHEMICAL AND CHEMICAL ETCH PROCESS FOR HIGH VOLT ALUMINUM ANODE FOIL

BACKGROUND OF THE INVENTION

1. Field of the Invention

The invention relates to the etching of aluminum electrolytic capacitor foil of a high cubic texture in a first etching bath containing hydrochloric acid and aluminum chloride using direct current and followed by a bath in nitric acid in a second step to produce a high volt foil that has a significantly higher capacitance.

2. Description of the Prior Art

In the typical process of etching aluminum foil for use in electrolytic capacitors, an electrolytic bath containing sodium chloride or other salt and sulfate based electrolytes has been used as a first step. Such a solution is typically neutral in pH value. This is frequently followed by a bath in nitric acid. However, the specific capacitance of the resulting foil does not reach the high values which are achieved with the present invention. Typical CV product values at 260 volts range up to 200 volt-uf/cm$^2$.

U.S. Pat. No. 4,213,835 discloses a method for electrolytically etching a recrystalized aluminum foil which allows manufacture of foils with exclusively pure cylindrical or cubical etching tunnel structures and tunnel densities greater than $10^7$/cm$^2$ of foil surface. This process uses a potentiostatic etching technique. The problem with this technique is that it does not lend itself to large scale mass production of etched foils.

U.S. Pat. No. 4,420,367 discloses a method for etching a recrystallized aluminum foil for electrolytic capacitors by carrying out an electrolytic tunnel etching process in a first etching stage, as is common in the art. The improvement of this patent relates to the provision that the continued etching for enlarging the tunnels is nonelectrolytic, being accomplished chemically in one or several etching stages. In the first stage, the recrystallized aluminum foil is subjected to electrolytic tunnel formation to form a tunnel structure in the aluminum and in the second stage the aluminum foil with tunnel structure from the first etching stage is subjected to at least one further nonelectrolytic etching stage to effect tunnel enlargement by chemical etching.

Still other processes have been used to yield a higher specific capacitance in aluminum foils. The present invention is directed to achieving a significant increase in specific capacitance for high volt foils.

SUMMARY OF THE INVENTION

The invention features the etching of aluminum capacitor anode foil having a high cubic texture to produce a more uniformly etched foil and very higher capacitance than obtained by present processes.

Several factors are necessary for increasing the specific capacitance of aluminum electrolytic capacitor foil. One factor is a significant improvement in tunnel density and tunnel structure. Substantially straight elongated tunnels provide much of the surface area created by etching. As tunnel density is increased, a corresponding enlargement of the surface area will occur. Another major factor in controlling the specific capacitance is the type of aluminum foil which is used. It is well known that the etched tunnels in anode foil suitable for high volt applications are predominantly in the 100 direction. It is therefore reasonable to assume that foil with greater 100 crystal orientation, that is foil with greater cubic texture, would result in a higher tunnel density. The aluminum foil used for etching until recently has had random cubic texture. Such foils may be called "non-cubic", foils with less than 25% cubic texture. When the extent of cubic texture exceeds 50%, aluminum foils are classified as high cubic. In the present invention an aluminum foil having a high cubic texture, substantially greater than 50%, is preferred over foils of lower cubicity because when etched, the tunnel structures are found to be uniform and elongated and the tunnel density can consequently be increased. Another major factor controlling the increase in specific capacitance is the etch process which controls the tunnel initiation and the depth and width of the etched tunnels. As shown in Table I, a combination of a suitable choice of both aluminum foil to be etched and an etch process will result in a more uniform tunnel initiation, and a significantly higher capacitance than previously obtained.

TABLE I

| Foil Type | Process Type | CV at 260 Volts, $\frac{\text{V-uF}}{\text{cm}^2}$ |
| --- | --- | --- |
| Standard Non-Cubic | Conventional | 200 |
| Standard Non-Cubic | This Invention | 210 |
| New Hi-Cubic | Conventional | 210 |
| New Hi-Cubic | This Invention | 360 |

The chemistry of the etch electrolyte in the first step of the present invention is a major factor for controlling the etch characteristics of DC etching of high voltage, e.g. over 200 volt, anode foils. Hydrochloric acid is used in preference to other chlorides in this application because it avoids the precipitation of aluminum hydroxide which can clog the very elongated tunnels which are developed in the process of the present invention. If such precipitation is allowed to occur, it will interfere with the high cubic nature of the foil, thereby not fully utilizing the benefits that can be derived when a suitable combination of the high cubic texture foil and an etch process is employed. This is shown in line three of TABLE I which indicates the result of using a high cubicity foil with a conventional etch process, yielding a much lower capacitance. The temperature in the first step is maintained at or below 85° C. to minimize evaporation losses thus making the process far more economical and easier to control.

In a first step, the foil is etched under the influence of DC current in an electrolyte bath containing 1.5 to 7% hydrochloric acid and 0 to 2% aluminum in the form of aluminum chloride at 70° to 85° C.

In the second step, the foil is treated in an aqueous bath containing 2 to 11% nitric acid, 0 to 3.5% aluminum as aluminum nitrate at 80° to 95° C. for 3 to 12 minutes. The resulting foil has a CV ranging up to 360 volt-uf/cm$^2$ in production quantities. Laboratory tests indicate that higher values are possible.

The process of the present invention results in a very efficient and economical two step etch process that yields capacitance values equal to or significantly higher than the best available commercial foils without requiring major changes in existing production machinery. The advantages of the inventive process consist in that etched tunnel structures with a tunnel density greater than $10^7$/cm$^2$ of foil surface are obtained and the etched tunnels are uniformly distributed over the foil. With the help of the inventive process, the highest possible surface enlargement and capacitance gain with the smallest possible aluminum erosion is obtained while maintaining sufficient foil strength.

DESCRIPTION OF THE PREFERRED EMBODIMENT

For the preferred embodiment, aluminum electrolytic capacitor anode foil having a high cubic texture, preferably over 70%, and having a thickness of 70 to 100 microns is in the first step etched by treating the foil with an etch electrolyte bath containing 3% hydrochloric acid and 1% aluminum as a chloride under the influence of DC current at 75° C. The current density is 0.40 to 0.45 amps/cm$^2$ and the etch coulombs are 9-15 coulombs/cm$^2$. In the second step of the preferred process, this etched foil is treated in an aqueous bath containing 8% nitric acid, 2.6% aluminum as aluminum nitrate, the solution being maintained at 85° C. The purpose of this solution is the enlargement of the tunnels initiated in the first step. The time in the nitric acid will range from 4 to 7 minutes. Depending on this time, there will be a range of results, such that for a foil formed at 260 volts, the minimum capacitance voltage product will be 285 volt-uf/cm$^2$ and the maximum will range to 360 volt-uf/cm$^2$. For foil formed at 465 volts, the CV products will range from 243 to 321 volt-uf/cm$^2$.

Optimizing the present process to take into consideration three critical factors, the mechanical strength of the foil, the high capacitance and the cost in production, the following values are used. In the first step, the current density is maintained at 0.40 amperes/cm$^2$ and the etch coulombs are 9. In the second step, the time in the solution is 6 minutes. The optimum CV products resulting from this process are 355 volt-uf/cm$^2$ for foil formed at 260 volts and 320 volt-uf/cm$^2$ for foil formed at 465 volts. This two step process provides an etched tunnel structure as shown by the SEM photographs in FIGS. 2a, which was taken after the first step, and 2b, which was taken after the second step.

Figure 1:
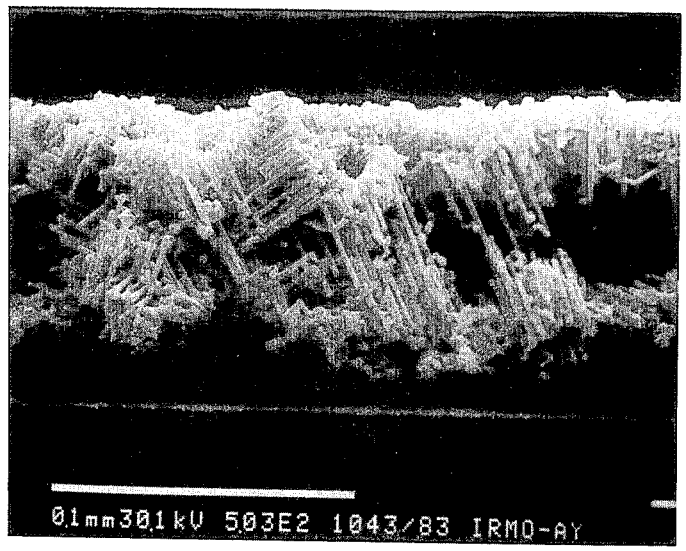
FIG. 1 is an SEM photograph of a cross-section of a piece of aluminum electrolytic capacitor anode foil etched in the traditional method showing the tunnel structure thus obtained.
Figure 2A:
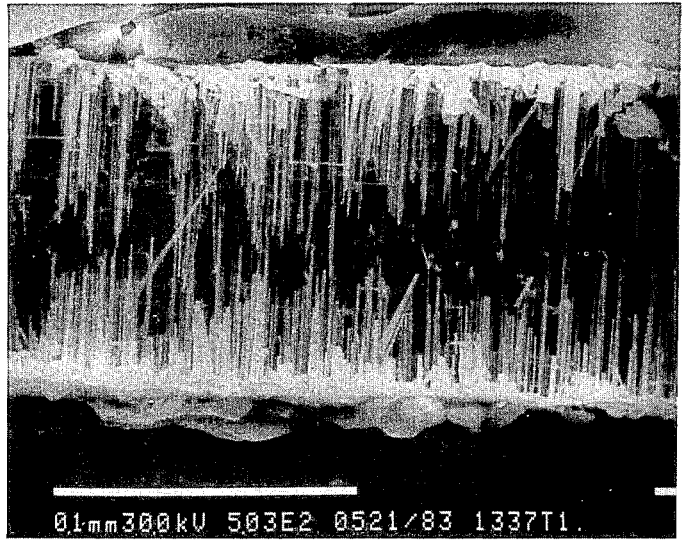
FIGS. 2a and 2b are SEM photographs of a cross-section of a piece of aluminum electrolytic capacitor anode foil etched according to the process of the present invention showing the relatively straight, elongated tunnel structure which is obtained thereby, FIG. 2a after the first step of the process of the present invention and FIG. 2b after the second step of this process.
Figure 2B:
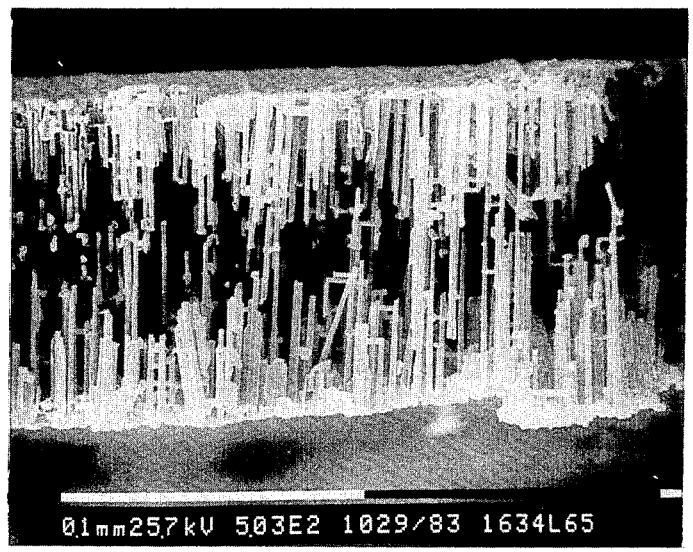

The figures show tunnel structures of a cross-section of etched foil. The linear light grey structures are the etched tunnels of the foil and the boundary surfaces of the foil are slightly discernable above and below the tunnels against the mounting mat. In contrast to the prior art, as illustrated in FIG. 1, the relatively straight, elongated tunnel structure which appears in the vertical plane in the SEM photographs of FIGS. 2a and 2b is evident. The light grey areas which are the tunnels penetrate further through the foil. They appear in a somewhat regular pattern and the density of the tunnel structure is significantly greater than that of the prior art as shown in FIG. 1. Of key interest in the photographs is the fact that many tunnels do not intersect one another, thereby removing foil from the structure.

In the process of the present invention using high cubic texture foil, having a cubicity of 75%, as described above, the amount of aluminum dissolved in terms of milligrams/cm$^2$ is about 6.5±0.5. The following table shows the specific capacitance of the foil when anodic oxides are formed at 260 volts and 465 volts. The CV number is the capacitance times the voltage and the CV/mg number is the capacitance times the voltage divided by the amount of aluminum dissolved per cm$^2$. This number is a measure of the relative efficiency of the etching process.

TABLE II

| Al Dissolved mg/cm$^2$ | 260 Volts | | 465 Volts | |
|---|---|---|---|---|
| | CV | CV/mg | CV | CV/mg |
| 5.1 | 304 | 59 | 284 | 55 |
| 6.3 | 338 | 53 | 320 | 50 |
| 7.35 | 374 | 50 | 338 | 46 |

Among the parameters of the present invention, the following variations are permissible. The aluminum foil used is a foil having a very high cubic texture which means that this foil has a high orientation of grains in the 100 direction. For the purposes of the processes of the present invention, it has been discovered that a foil having at least 70% of its grains oriented in the 100 direction is sufficient to achieve the desired results. Such foils are commercially available from Showa Aluminum Company, Toyo Aluminum Company and SCAL, a Division of Pechiney Aluminum Company. A high cubicity foil enables the etching of very straight tunnels while retaining surface area created by the etching. The tunnel initiation tends to be more uniform and the tunnel density can then be increased. The higher the cubicity of the foil, the higher the specific capacitance will be. For production purposes, however, it has been empirically determined that the cubicity of 70% or higher will suffice.

A range of values for the other parameters of the present process is also possible. The chemistry of the first step electrolyte is aimed at producing an acidic medium having a large presence of chloride. Hydrochloric acid is preferred to avoid the precipitation of aluminum hydroxide which would occur with sodium chloride. The addition of aluminum to the electrolyte makes the electrolyte bath less expensive and minimizes electrolyte replacement in the process. The range of parameters for the first step electrolyte bath are as follows. Hydrochloric acid can be present in concentrations ranging from 1.5% to 7% and the aluminum in the form of chloride can be present in the range of 0% to 2%. The temperature range of the first step can be from 70° to 85° C. The current density can range from 0.25 to 0.60 amperes/cm$^2$. The etched coulombs can range from 6 to 25 coulombs/cm$^2$. These ranges have been empirically determined for purposes of mass production of a high volt foil. The latitude in the ranges presented enables high speed mass production of foil without elaborate control systems for monitoring these parameters, thus making the installation of the process of the present invention relatively inexpensive. In terms of the temperature range, over 85° C. evaporation becomes a significant factor. If the temperature is lower than 70° C., the etching process either will not work or will work less efficiently in initiating the required number of etched tunnels. In terms of the current density, a density below the low point of the range will result in lower tunnel initiation and consequently, lower tunnel density. If the current density is higher than the range stated, the tunnel size will tend to be non-uniform because there will be competition between the deepening of the tunnels already initiated and the initiation of new tunnels. As in any etching process, non-uniform tunnels are to be avoided since many in effect will be closed when the anode foil is formed with an oxide at high voltages.

The range of values for the second step in the process is as follows. In the bath of the second step the nitric acid may range from 2% to 11% and the aluminum as aluminum nitrate may range from 0% to 3.5%. The temperature range may be from 80° to 95° C. and as stated previously the time in this bath may range from 3 to 12 minutes.

Figure 3:
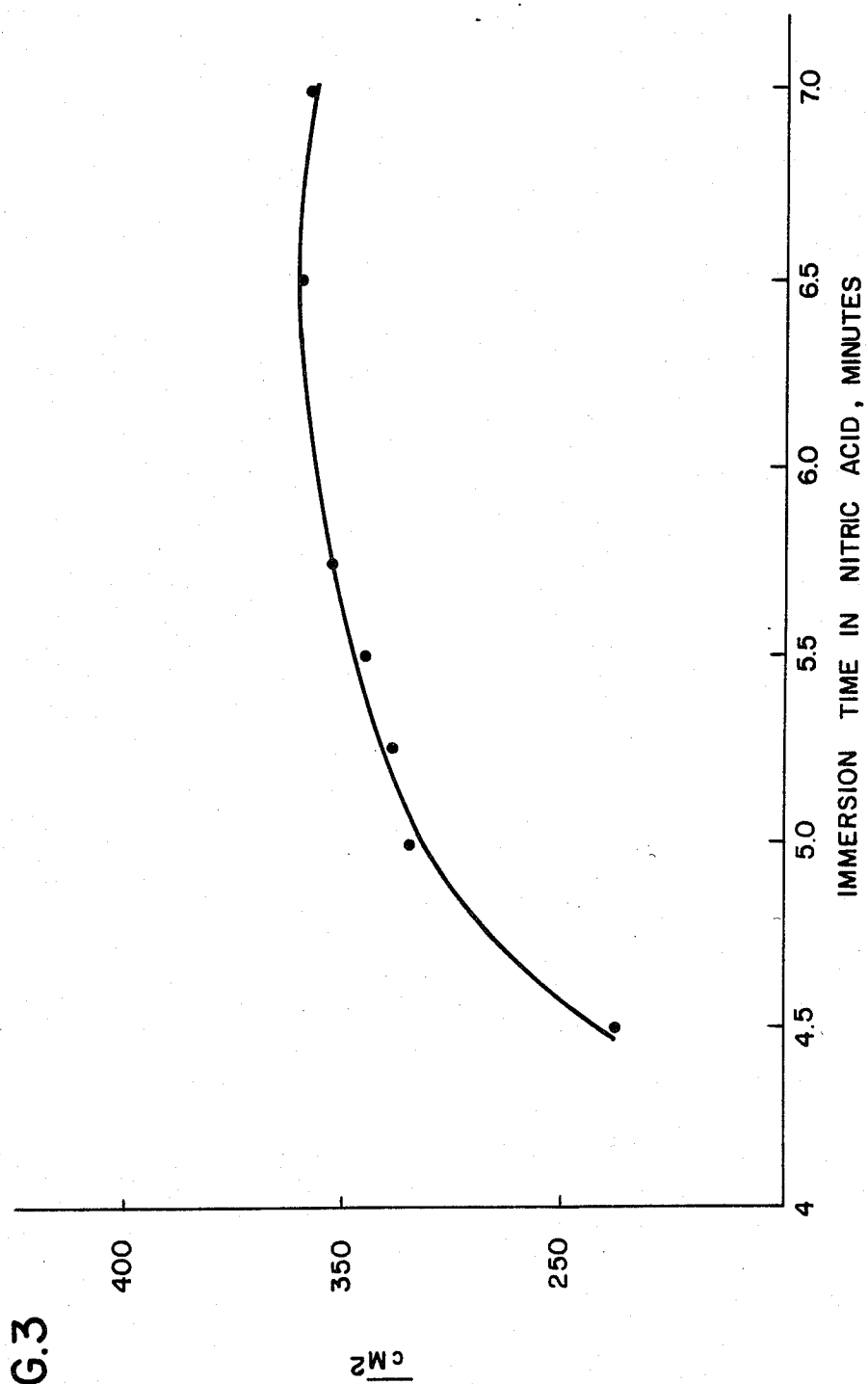
FIG. 3 is a graph showing the effect of time in nitric acid on capacitance.

In FIG. 3, a graph is presented showing the effect of immersion time in nitric acid on capacitance in the formed foil.

From the examples, it is obvious that foils etched in accordance with the present invention can be used in high volt electrolytic capacitors and yield a significantly higher specific capacitance per cm² than previously obtained. Thus to obtain the given capacitance, the capacitor can have a smaller volume or for the same volume can have a higher capacitance. Although various minor modifications may be suggested by those versed in the art, it should be understood that I wish to embody within the scope of the patent warranted hereon such modifications as reasonably and properly come within the scope of the appended claims.

What is claimed is:

1. A two step process for etching aluminum electrolytic capacitor anode foil wherein such foil has a high cubic texture, greater than 70% cubicity, comprising a first step of:
    treating said foil in an electrolyte bath containing between 1.5% and 7% hydrochloric acid and 0% to 2% aluminum as a chloride under the influence of direct current at a temperature between 70° C. and 85° C.; and
    passing a charge of 6 to 25 coulombs through said foil while said foil is immersed in said hydrochloric acid bath and having a current density between 0.25 and 0.6 amperes/cm²; and
    in a second step, treating said foil emerging from said first bath in an aqueous bath consisting of from 2 to 11% nitric acid and between 0% to 3.5% aluminum as aluminum nitrate for a period of 3 to 12 minutes at a bath temperature of 80° to 95° C.

2. A process according to claim 1 wherein said aluminum foil has a cubicity of 70% or greater.

3. A process according to claim 1 wherein the percentage of hydrochloric acid in the electrolytic bath of said first step is 3%.

4. A process according to claim 1 wherein the percentage of aluminum as a chloride in said electrolytic bath in said first step is 1.%.

5. A process according to claim 1 wherein the temperature in said first step is 75° C.

6. A process according to claim 1 wherein the current density in said first step is 0.40 amperes/cm².

7. A process according to claim 1 wherein the etch coulombs are 9 coulombs/cm².

8. The process of claim 1 wherein in said second step said bath comprises 8% nitric acid.

9. The process of claim 1 wherein in said second step said bath contains 2.6% aluminum as aluminum nitrate.

10. The process of claim 1 wherein the temperature of said second bath is 85° C.

11. The process of claim 1 wherein said foil is treated in said bath in said second step for 6 minutes.

* * * * *